Dec. 24, 1935.  A. Y. DODGE  2,025,232
LUBRICATING DEVICE
Filed Feb. 8, 1932  2 Sheets-Sheet 2
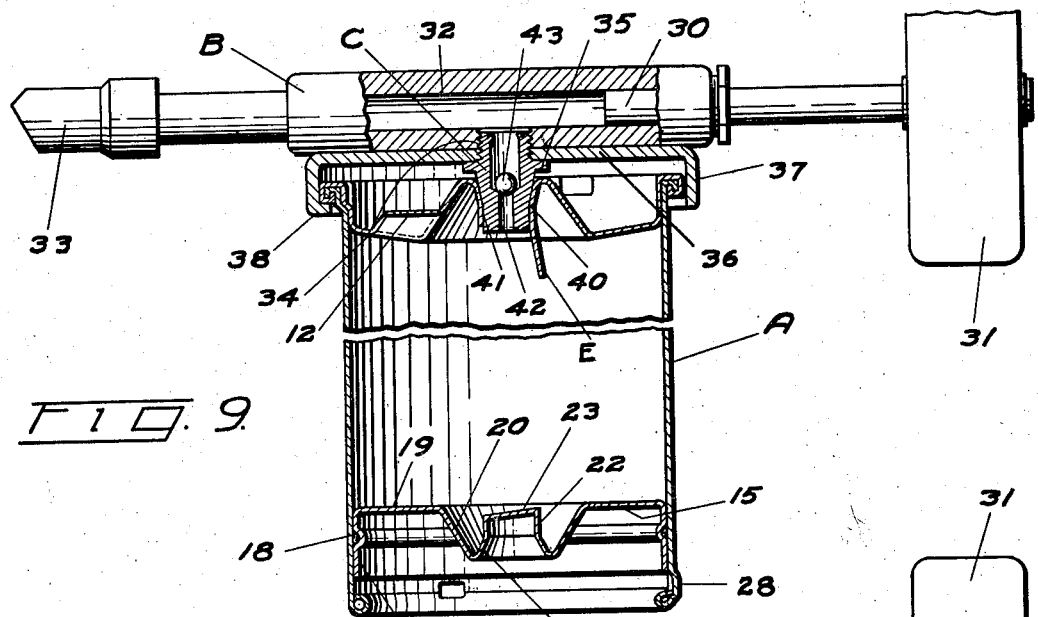
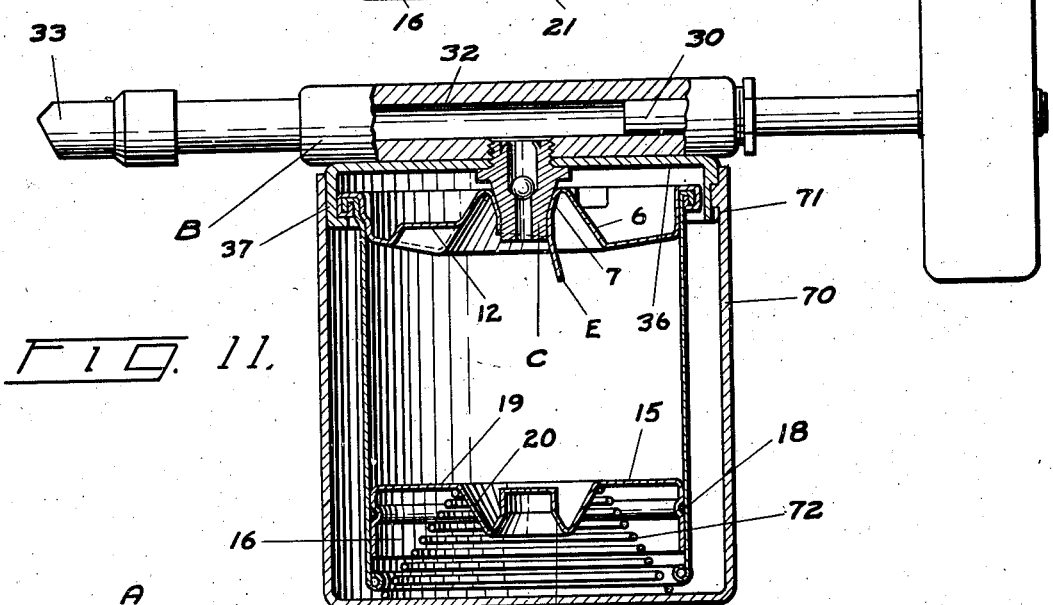
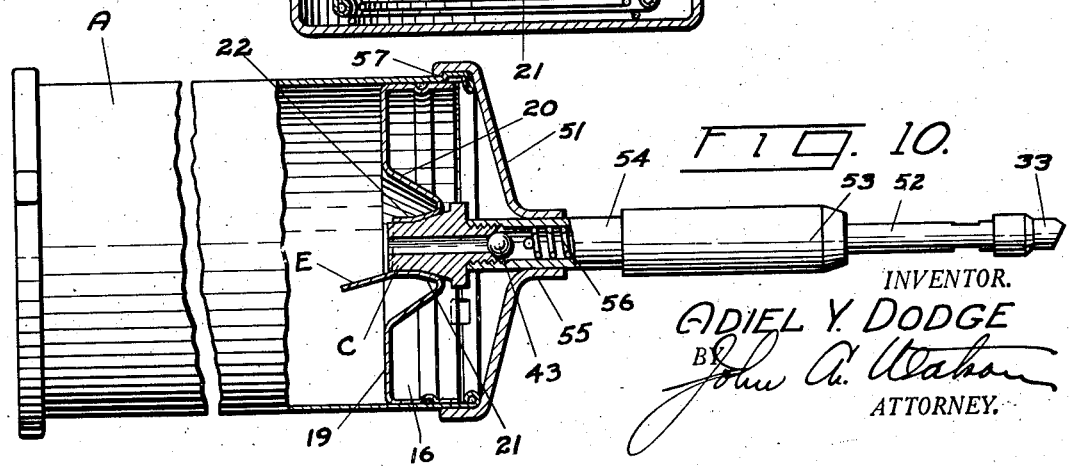
INVENTOR.
ADIEL Y. DODGE
BY
ATTORNEY.

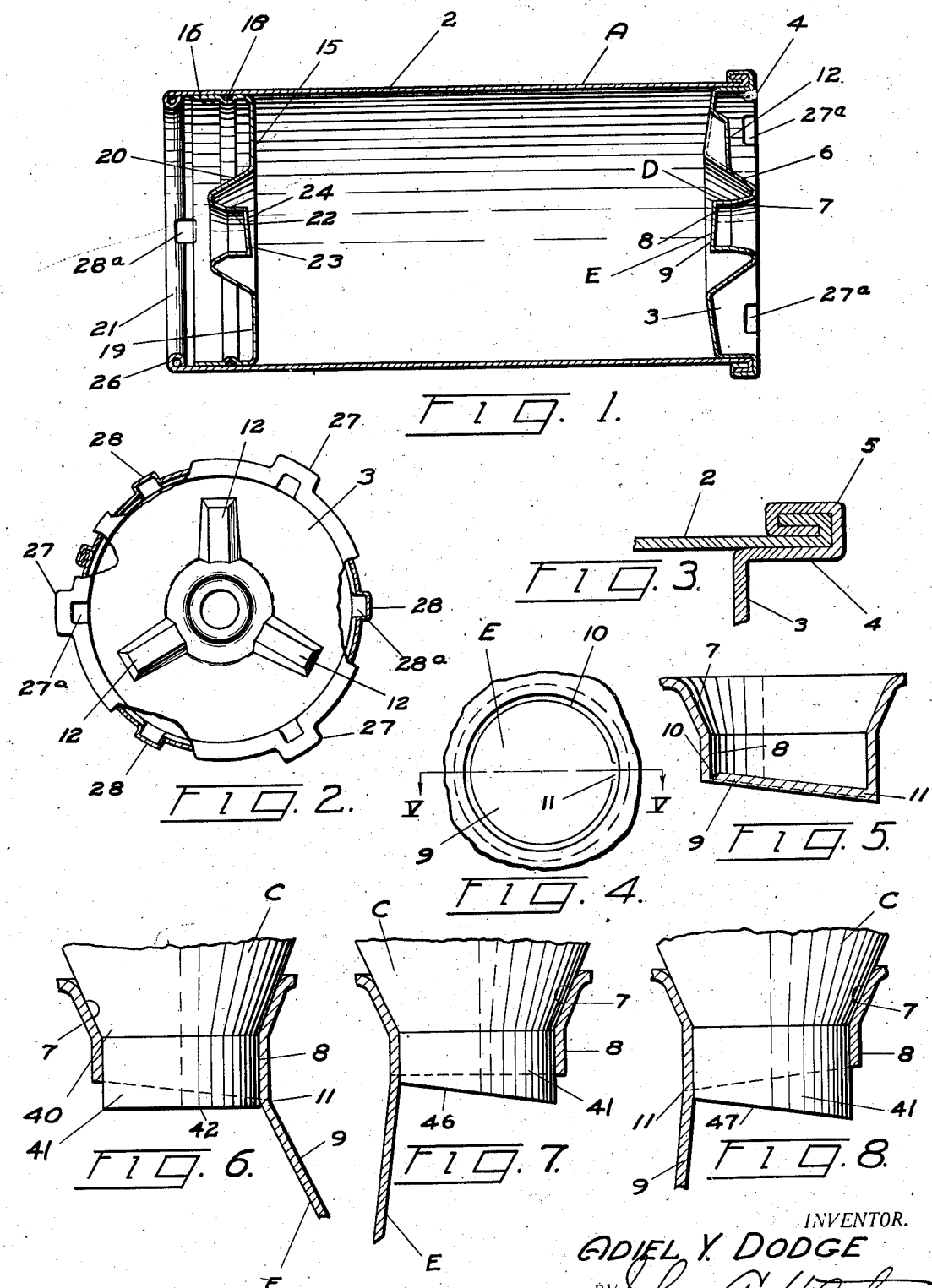

Patented Dec. 24, 1935

2,025,232

UNITED STATES PATENT OFFICE 2,025,232

LUBRICATING DEVICE

Adiel Y. Dodge, South Bend, Ind., assignor to The Lubrication Corporation, South Bend, Ind., a corporation of Delaware Application February 8, 1932, Serial No. 591,535

22 Claims. (Cl. 221—47.3)

This invention relates to lubrication devices and more particularly to lubricant filled cartridges for use in charging lubricant feeder guns and the like.

An object of the invention is to provide an assembly in which lubricant or other material to be dispensed is supplied in a cartridge which forms a part of the dispensing or feeding apparatus and which when exhausted, may be thrown away and a fresh cartridge substituted. This arrangement not only provides a simple and clean method of handling the lubricant, but permits the sale of tested and approved lubricants in sealed and properly identified packages instead of in bulk.

Another object is to provide a lubrication device including a feeder gun and a cartridge therefor having an outlet orifice provided with a frangible closure, the feeder and the cartridge being so formed as to compel the partial severing and displacement of the frangible closure as the cartridge is installed therein to establish intercommunication between the cartridge and the pressure cylinder of the feeder gun.

Another object is to provide a lubrication device as described, in which means is provided for mechanically holding the outlet orifice of the cartridge in proper alignment with the lubricant inlet stud of the feeder gun to assure full cooperation between the orifice and the contacting surfaces of the inlet stud, whereby a lubricant-tight seal is maintained therebetween.

Another object is to provide a lubricant cartridge having an improved follower or pressure piston provided with an outlet orifice and frangible seal for permitting the discharge of lubricant from the cartridge through the piston upon piston movement.

A further object is to provide a lubricant cartridge of relatively light stock wherein novel construction is employed to provide in the outlet orifice a relatively unyielding contact surface.

Other objects and advantages and uses of the invention will become apparent after reading the following specification and claims and viewing the accompanying drawings forming a part of this application, in which:

Fig. 1 is a sectional view of a lubricant cartridge embracing the present invention;

Fig. 2 is an end elevation of the cartridge illustrated in Fig. 1 with portions broken away;

Fig. 3 is an enlarged fragmentary view of a part of the structure illustrated in Fig. 1;

Fig. 4 is an enlarged elevation of the cartridge outlet closure;

Fig. 5 is a sectional view along the line V—V;

Fig. 6 is an enlarged view partly in section, of a portion of the assembly illustrated in Fig. 9;

Fig. 7 is a view similar to Fig. 6 illustrating a modified form of the structure;

Fig. 8 is a view similar to Fig. 6 illustrating a further modification of the structure;

Fig. 9 is a part sectional view illustrating a lubricant gun with the cartridge of Fig. 1 in place;

Fig. 10 is a part sectional view illustrating the cartridge of Fig. 1 in another type of lubricant gun; and Fig. 11 is a part sectional view of a modified form of the apparatus illustrated in Fig. 9.

In general, my invention embraces a cartridge A preferably of metal, adapted to mechanically interlock with a lubricant gun B or the like, to become a cooperating part thereof and in providing for the interconnection of the cartridge and gun nozzle by the introduction of an apertured inlet stud C on the gun, communicating with the nozzle, into the outlet orifice defined by the tubular neck D formed in the end wall of the cartridge, the initial introduction of the stud serving to break and displace the frangible closure E normally closing the outlet.

In Figs. 1 to 5 inclusive, I have shown a lubricant cartridge A constructed in accordance with the invention, and in Figs. 9 and 10 I have illustrated the same cartridge applied to two different types of lubricant guns.

The cartridge A comprises the cylindrical metal body 2 closed at one end by an inset and inwardly dished head plate 3 having side walls 4 extending parallel to and contacting with the adjacent inner side walls of the body 2. The end plate is secured to the cylindrical body by rolling over the adjacent edges to form a seam as shown at 5 in Fig. 3, thus providing a lubricant tight joint.

The head plate 3 is further formed with an outwardly extending centrally located conical side walled extension 6 which is turned back and inwardly to form an oppositely disposed conical wall 7 forming a seat for the reception of the lubricant conducting stud C which has a similarly formed outer side wall. The inner end of the wall 7 as shown at 8 extends parallel with the axis of the body 2 to form a reinforcing and guide sleeve and is initially closed by a frangible and integral closure 9 (see Fig. 5).

The closure 9 is disposed in a plane inclined with respect to the axis of the body 2 and is circumferentially scored at 10 on its inner side about all but a small part 11 of its periphery. The unscored portion 11 serves as a hinge for the closure as it is separated from the neck 8 along the scoring 10 and to hold the closure within the cartridge in a position where it may not obstruct the free passage of lubricant therefrom, or be drawn into the flow of lubricant as it moves into the neck D.

Aside from the dished contour of the head plate 3 to minimize flexing of the head plate when pressure is applied thereto, as when the cartridge is installed, a plurality of ribs 12, are formed in the plate and extend outwardly from the conical wall 6 to points near the base of the side walls 4, which ribs aside from increasing head rigidity also serve to strengthen and maintain the conical walled extension 6 as initially formed.

A piston 15 is slidably disposed within the cylindrical body of the cartridge and has an integral rearwardly extending skirt 16. The skirt 16 has an annular depression in its outer wall in which a packing cord 18 is placed to serve as a piston ring or seal.

Exact complements of the parts 6, 7, 8, 9, 10 and 11 of the head plate 3 are formed in the end wall 19 of the piston as designated at 20, 21, 22, 23, 24 and 25 respectively. The end wall 19 of the piston, however, is not dished nor does it have the reinforcing ribs 12.

It is intended that the cartridge be filled with lubricant by the manufacturer prior to the fixing of the head 3 in place upon the cylindrical body 2. The piston 15 is first moved to the rear of the cylindrical body so that the skirt of the piston will contact with a bead 26 rolled in the rear edge of the cylinder to prevent dislodgment of the piston. Thereafter, the head 3 is fixed to the cylindrical body by a lock seam illustrated in section in Fig. 3. If the frangible closure E is not to be employed in the head 3 and a cap or other removable seal is to be substituted therefor, the cartridge may be filled through the opening in the head, in which case the piston could be initially moved to the forward end of the cartridge and forced rearwardly as the lubricant was admitted through the opening. This latter procedure is suggested to eliminate the possibility of pockets of air forming within the cartridge.

Three equally spaced apart embossed lugs 27 are formed on the outer surface of the rolled seam 5 at the permanently closed end of the cartridge which leave corresponding depressions 27a on the inner wall at the head as shown in Figs. 1 and 2. The purpose of the lugs 27 is to engage cooperating members on the feeder gun to hold the cartridge in place thereon where interconnection of the cartridge and feeder occurs through the head plate 3. Similar lugs 28 are formed at the other end of the cartridge through the beaded portion 26 which leave corresponding depressions 28a on its inner walls. The lugs 28 are employed when the cartridge is fixed to a gun where interconnection between gun and cartridge is to occur through the piston 15.

It will be noted that the cartridge thus far described comprises a lubricant-tight sealed unit capable of being shipped, stored or otherwise handled without loss of contents. It is in this condition that the cartridge is intended to be distributed to the consumer.

In Fig. 9 the cartridge illustrated in Fig. 1 is shown as forming a part of a hand lubricant gun B, wherein lubricant pressure is produced by manual operation of a plunger piston 30 having a hand grip 31. The piston 30 is disposed in an elongated cylinder 32 communicating through a check valve of conventional construction (not shown), with a discharge nozzle 33.

The inlet stud C is secured to the cylinder 32 by means of an externally threaded portion which is engaged with an internally threaded passage through the lower side wall of the cylinder as shown at 34. The stud is further formed with an annular flange 35 between which and the cylinder wall, a centrally apertured cartridge grip plate 36 is secured. The plate 36 has a depending annular side wall 37 formed with integral bayonet shoulders 38 by means of which the cartridge is supported and drawn to the plate through cooperation with the lugs 27 of the cartridge as the cartridge is turned within the side wall 37.

As previously described, the inlet stud is provided with a conical side wall 40 conforming in contour to the inner surface of the conical seat 7 of the cartridge outlet. The stud is also provided with a portion forward of the wall 40 that has a cylindrical side wall 41 conforming in diameter to the guide portion 8 of the cartridge outlet but exceeding in length the deepest portion of that member. The lower end wall 42 of the stud lies in a plane perpendicular to its axis. A ball check valve 43 is disposed within the longitudinal passage of the inlet stud to prevent return of the lubricant to the cartridge during operation of the piston 30.

In assembling the lubricant gun as shown in Fig. 9, the cartridge, just as received from the supplier, is held with the closed outlet in the head plate 3 aligned with the inlet stud C of the gun B and the lugs 27 at the head of the cartridge engaged with the bayonet shoulders 38 of the grip plate 37 and rotated.

As the cartridge is rotated, it is drawn toward the grip plate by bayonet action until the lower wall 42 of the stud C engages with and shears away the closure 9 along the scoring 10. Continued rotative movement draws the conical seat 7 tightly into engagement with the conical wall 40 of the stud C to form a lubricant tight connection therebetween. During this latter movement, the closure 9 is bent on its hinge portion 11 entirely free of the opening of the passage through the stud occupying the position shown in Figs. 6 and 9. The piston 15 remains undisturbed. The gun is now ready for use.

It should be noted at the time that the head plate 3, as a result of this method of pressure sealing between the cartridge and gun stud, is subjected to considerable and constant inward thrust. It is for this reason that the head is dished inwardly as it is to be expected that but little further inward flexing of the head may occur whereas the contrary might be expected if the head plate was made with a slight outward bulge. The ribs 12 aid in lending rigidity to the head 3 and maintain the conical extension 6 against spreading which might misshape the seat 7.

Further and highly effective means for retaining initial contour of the seat 7 is provided in the integral sleeve portion 8 which, as described, is adapted to receive the lower portion 41 of the stud C for the further function of holding the stud and seat 7 in axial alignment so that the seal therebetween may not be impaired.

In use the gun illustrated in Fig. 9, including its now operatively inter-related cartridge is held with the nozzle 33 engaged with a lubrication fitting or nipple. The plunger piston 30 is then retracted by manual operation of the hand grip 31, creating a depression in the cylinder 32 which causes lubricant from the cartridge to be forced by atmospheric pressure against the piston 15 up through the check valve 43 in the inlet stud C into the cylinder. The piston 30 may now be forced forwardly to discharge lubricant under pressure through the nozzle 33 into the fitting.

In Figs. 7 and 8, I have illustrated two modifications of the feeder inlet stud C and the frangible closure E of the cylinder head or piston. In that form shown in Fig. 7, the stud C is fashioned with its cylindrical walled portion 41 provided with an end wall 46 inclined with respect to the longitudinal axis of the stud and to the frangible closure E. The closure E is disposed in a plane perpendicular to the axis of the stud C. In Fig. 8 the frangible closure E remains as initially described and as shown in Fig. 6 and the cylindrical walled portion 41 of the stud C is lengthened and formed with its end wall 47 inclined with respect to the axis of the stud as described in connection with Fig. 7.

A feature common to all of the forms shown in Figs. 6, 7 and 8 is that the cylindrical port 41 of the stud C preferably should exceed in minimum side wall depth the minimum side wall depth of the cylindrical sleeve portion 8 of the cartridge outlet and that the end wall of the stud and the inner face of the frangible closure should be inclined with respect to one another. This arrangement assures a shearing action between stud and closure to sever the latter along its scoring 10 as the cartridge is drawn toward the stud in the manner described.

In Fig. 10, I have shown the same cartridge illustrated in Figs. 1 and 9 employed in lubricant feeder gun of an entirely different type, identified in the art as a push type gun. In the push type gun lubricant is fed from the cartridge to the feeder apparatus through the cartridge piston. The gun consists of two major parts, the cap 51 supporting the lubricant feeder pump and the cartridge forming the source of lubricant supply.

The feeder pump includes a plunger 52 having a discharge nozzle 33 at its outer end adapted to engage with a lubricant fitting or nipple for feeding lubricant thereto, which plunger is free to slide in a cylinder or barrel 53 which in turn is supported upon a sleeve 54 slidably mounted in a tubular bearing 55 centrally located in the cap 51. A lubricant conductor stud C similar to that illustrated in Figs. 6 and 9 in outer contour is fixed to the inner end of the sleeve 54. The plunger 52 is urged outwardly by a compression spring 56.

Means for mechanically interlocking the cap 51 and the cartridge comprising bayonet shoulders 57 formed on the inner wall of the cap 51 for engagement with the lugs 28 and arranged so as to draw the end of the cartridge into close engagement with the rear wall of the cap when the cartridge is rotated therein.

When using the cartridge in the push type gun the frangible closure in the head 3 is of course left undisturbed. The closure 23 of the piston, however, may be severed by either a tool such as a screw driver used prior to installing the cartridge or the barrel 53 may be forced toward the cap 51 after the cartridge is fixed in place to cause the stud C to engage with and sever the closure as described.

Lubricant under low pressure is initially admitted to the feeder pump by pressure on the cartridge, thereby forcing the lubricant through the cartridge piston, the stud C and its check valve 43 into the barrel 53. The lubricant in the barrel 53 is forced out through the nozzle 33 by movement of the plunger 52 into the barrel 53. During use the gun is held by the cartridge and the nozzle is pressed against the fitting or nipple. When manual pressure is relieved the plunger 52 will be urged outwardly by the spring 56 thus creating a depression in the barrel or cylinder 53 which causes lubricant to be drawn from the cartridge thereto.

In Fig. 11, I have shown a lubricant gun of the style illustrated in Fig. 9 but including in addition a casing 70 secured by bayonet structure 71 to the skirt 37 of the grip plate 36 and a compression spring 72 beneath the piston 15 to urge the piston toward the outlet end of the cartridge.

This type of gun operates exactly as that shown in Fig. 9 except that positive pressure is applied to the piston instead of relying upon atmospheric pressure alone. The piston 15 because of its conical extension 20 on the rear face of the head 9, affords positive means for locating the upper end of the spring 72 so that it will not shift laterally thus assuring equal thrust on all parts thereof.

The main portion or head of the fixed end and the corresponding portion of the piston or follower (in some forms illustrated only one or the other of these parts) may be inset as well as dished. Insetting serves somewhat to strengthen the end but primarily is to permit the cartridge to be stood on end and to provide protection against damage for the boss containing the outlet and outlet sealing surface.

The word "inset" as used herein with reference to the construction of the fixed end and follower of the cartridge, is intended to mean set within a recess, or, set back, or, not fully projecting. For example, the fixed head or end 3 of the cartridge shown in Fig. 1 is so constructed and arranged that when it is secured to the cartridge body, no part within the rim or end seam projects outwardly beyond the plane of such rim or end seam, and the central part of the piston or follower is similarly arranged. However, it is intended that the word "inset" shall also have the significance of set back in part, as, for example a construction in which substantially all parts of the head within the rim except perhaps the peak or boss about the outlet orifice, lie below the plane of the rim and the peak or boss projects beyond such plane. It is preferable, of course, to have the head sunk below the plane of the rim or just flush therewith because the cartridge may then be stood on end.

The term "dished" is intended to have a significance with reference to the general shape of the end (fixed end or follower) which in the specific embodiments of the invention illustrated is substantially concave even though the head is "inset". Both "insetting" the end and "dishing" the end serve various functions including strengthening the cartridge construction, as will be understood.

It is to be understood that the above embodiment of the invention is for the purpose of illustration only and various changes may be made herein without departing from the spirit and scope of the claims.

I claim:

1. In a lubrication device, an interchangeable lubricant cartridge comprising, a cylindrical body having an end wall, said end wall being formed with an outlet opening therethrough the wall of which extends inwardly of said body and is conical in contour at that portion adjacent to said end wall and cylindrical in contour at the opposite portion thereof.

2. In a lubrication device, a lubricant cartridge comprising, a cylindrical body having an outlet opening therefrom, said opening being defined by a wall extending inwardly of said body including a cylindrical side wall of substantial length and an adjacent portion having a side wall flaring outwardly from said cylindrical wall and merging with the wall of said body.

3. A lubricant container having an inwardly inset and inwardly dished head at one end thereof provided with an outlet opening therethrough and an annular sealing surface about said outlet, and further formed with reinforcing ribs extending away from said outlet opening.

4. A lubricant container comprising, a cylindrical body having a head at one end thereof formed with an outlet opening defined by converging side walls depending inwardly of the container from the head, said head being further formed with a plurality of reinforcing ribs extending away from said outlet opening.

5. In a lubricant feeder apparatus, a lubricant cartridge having an outlet for supplying lubricant to said feeder apparatus, a cartridge grip plate for mechanically interlocking said cartridge with and to said apparatus, means detachably securing said plate to said apparatus, said means providing a lubricant tight seal with the cartridge wall around said cartridge outlet, and a casing for disposal over said cartridge, said casing being detachably secured to said grip plate.

6. In a lubrication device, a lubricant cartridge, and lubricant feeder apparatus including a plate having camming surfaces and a lubricant conducting stud having converging side walls and associated with said plate, said cartridge having lugs on its periphery at one end for engagement with said camming surfaces and an inwardly dished head at said end, said dished head having an outlet opening therethrough and being adapted to seat upon said stud at said opening and to form a seal between the cartridge and stud by a wedging action as the cartridge and stud are drawn toward one another by interengagement of said lugs and surfaces.

7. In a lubrication device, a lubricant cartridge, lubricant feeder apparatus including a lubricant conducting stud having converging side walls, said cartridge having an inwardly dished head with an outlet opening therethru adapted to seat upon said stud and to form a seal therebetween by a wedging action as the parts are drawn toward one another, and a plurality of reinforcing ribs formed on said cartridge head and extending away from said outlet opening.

8. In a lubrication device, a lubricant cartridge, lubricant feeder apparatus including a lubricant conducting stud having converging side walls, said cartridge having a head with an outlet opening therethru adapted to seat upon said stud and to form a seal therebetween by a wedging action as the parts are drawn toward one another, and a plurality of reinforcing ribs formed on said cartridge head and extending away from said outlet opening.

9. In a lubrication device, a replaceable lubricant cartridge comprising a cylindrical body having one end closed, said closed end having an outwardly extending central portion terminating in an inwardly extended tubular conical walled seat adapted to receive a lubricant conductor stud of complementary contour, said cylinder end including the outwardly extending portion thereof being further reinforced by a plurality of ribs formed therein.

10. A lubricant cartridge comprising a cylinder having one end closed, an outlet orifice defined by an acute conical walled depression in said closed cylinder end, the inner end of the depression comprising a flat closure lying in a plane inclined with respect to the axis of the cylinder and having its periphery partially scored to facilitate displacement.

11. In a lubrication device, a detachable lubricant cartridge, lubricant feeder apparatus including a lubricant conducting stud having an acute conical outer side wall, said cartridge having an outlet orifice forming a conical seat to conform with the outer wall of said stud, a frangible closure disposed in a plane inclined with respect to the outer end wall of said stud and means for interlocking said cartridge and feeder apparatus and simultaneously drawing said cartridge toward said stud whereby the frangible closure may be partially severed and displaced by shearing action as the end of the stud engages therewith.

12. In a lubrication device, a cartridge having an outlet provided with a frangible seal, and lubricant feeding apparatus for receiving said cartridge as a source of lubricant supply, said apparatus having a lubricant conducting stud for engagement with and projection into said cartridge outlet including that portion occupied by said frangible seal, said seal lying in a plane inclined with respect to the adjacent end wall of said stud.

13. In a lubrication device, an interchangeable lubricant cartridge, and lubricant feeder apparatus including a lubricant conducting stud having a conical outer side wall terminating at its outer end in a cylindrical wall parallel to the axis of the conical walled portion, said cartridge having a lubricant outlet formed with a conical inner wall adapted closely to seat upon the conical wall of said stud and being further formed with a tubular reinforcing and guide sleeve adapted to receive the said cylindrical walled portion of said stud.

14. In a lubrication device, an interchangeable lubricant cartridge, lubricant feeder apparatus including a lubricant conducting stud having a conical outer side wall, said cartridge having a lubricant outlet formed with a conical inner side wall adapted closely to seat upon the conical wall of said stud, means for securely interlocking said cartridge by one end only to said feeder apparatus to seat said conical outlet upon the stud, and means forming a part of the cartridge outlet wall and of said stud for maintaining axial alignment of the outlet and stud.

15. In a lubrication device, a cartridge having an outlet provided with a frangible seal, and lubricant feeding apparatus for receiving said cartridge as a source of lubricant supply, said apparatus having a lubricant conducting stud for engagement with and projection into said cartridge outlet including that portion occupied by said frangible seal, said stud having its forward end wall inclined with respect to the longitudinal axis thereof.

16. In a lubrication device, a cartridge having an outlet provided with a frangible seal, and lubricant feeding apparatus for receiving said cartridge as a source of lubricant supply, said apparatus having a lubricant conducting stud for engagement with and projection into said cartridge outlet including that portion occupied by said frangible seal, said stud having its forward end wall inclined with respect to the longitudinal axis thereof, said frangible seal being disposed in a plane inclined with respect to said longitudinal axis.

17. In a lubrication device, a cartridge having a piston slidably disposed therein, an outlet through said piston provided with a frangible seal and lubricant feeding apparatus for receiving said cartridge as a source of lubricant supply, said apparatus having a lubricant conducting stud mounted for movement along the axis of said cartridge and adapted to cooperate with said lubricant outlet, said stud having its forward end wall inclined with respect to said frangible seal, whereby initial engagement between said stud and said outlet will break said frangible seal to permit lubricant to flow through said piston into said fitting apparatus.

18. A connector for a lubricant dispenser comprising, a stud adapted to engage operatively with the outlet opening of a lubricant container, said stud being formed with converging side walls inclined at substantially 20° to the axis thereof and terminating at the outer end in a cylindrical walled portion.

19. A connector for a lubricant dispenser comprising, a stud adapted to engage operatively with the outlet opening of a lubricant container, said stud being formed with converging side walls inclined at substantially 20° to the axis thereof, terminating at the outer end in a cylindrical walled portion, said cylindrical walled portion having its end wall inclined with respect to the axis thereof.

20. In a lubrication device, a lubricant feeder apparatus comprising a lubricant pump, a cartridge connector stud for said pump, a cartridge connector plate associated with the pump for engaging with and supporting a lubricant cartridge with its outlet opening registered with said connector stud, and a casing detachably secured to said connector plate.

21. In a lubrication device, a lubricant feeder apparatus including a cartridge connector plate and a cartridge connector stud, a lubricant cartridge having a cylindrical body and a closure in one end having an orifice cooperative with said stud, said cartridge connector plate and said cartridge having interlocking means whereby to support the cartridge on said apparatus, and a casing surrounding said cartridge and detachably secured to said cartridge connector plate.

22. In a dispensing device, a fluid pump, a cartridge connector stud fixed to said pump having a passageway therethrough providing a fluid inlet port for said pump, the outer side walls of said stud being defined by the revolution of a line about the longitudinal axis of the stud, a fluid cartridge having an outlet opening, the walls defining the outlet opening being fashioned to contact with the outer side walls of the stud to form an annular fluid tight contact seal therewith, the outer end of said stud being truncated at an angle other than 90° from the longitudinal axis thereof.

ADIEL Y. DODGE.

CERTIFICATE OF CORRECTION.

Patent No. 2,025,232.　　　　　　　　　　　　　　　　December 24, 1935.

ADIEL Y. DODGE.

It is hereby certified that error appears in the printed specification of the above numbered patent requiring correction as follows: Page 4, first column, after line 39, insert the following as claim 6:

6. In a lubricant feeder apparatus of the type wherein lubricant is supplied to the feeder from a detachable cartridge having an outlet, said apparatus comprising a grip plate adapted mechanically to interlock the cartridge and said feeder apparatus together, and means detachably securing said plate to said apparatus, said means providing a lubricant passage from said cartridge outlet to said apparatus and forming a lubricant tight seal with the cartridge wall about said outlet.:

The claims now appearing in the patent as numbers 6, 7, 8, 9, 10, 11, 12, 13, 14, 15, 16, 17, 18, 19, 20, 21, and 22, should bear the numbers respectively, 7, 8, 9, 10, 11, 12, 13, 14, 15, 16, 17, 18, 19, 20, 21, 22, and 23; and that the said Letters Patent should be read with these corrections therein that the same may conform to the record of the case in the Patent Office.

Signed and sealed this 3rd day of March, A. D. 1936.

Leslie Frazer (Seal)　　　　　　　　　　　　　　　　　　　　　Acting Commissioner of Patents.